(12) United States Patent
Covely, III (10) Patent No.: US 7,716,632 B2
(45) Date of Patent: May 11, 2010

(54) AUTOMATED SOFTWARE ROBOT GENERATOR

(75) Inventor: Frederick Henry Covely, III, Oceanside, CA (US)

(73) Assignee: Vertafore, Inc., Bothell, WA (US)

( * ) Notice: Subject to any disclaimer, the term of this patent is extended or adjusted under 35 U.S.C. 154(b) by 1285 days.

(21) Appl. No.: 10/698,694

(22) Filed: Oct. 31, 2003

(65) Prior Publication Data

US 2004/0133897 A1    Jul. 8, 2004

Related U.S. Application Data

(60) Provisional application No. 60/423,648, filed on Nov. 1, 2002.

(51) Int. Cl.
*B06F 9/44*  (2006.01)
*B06F 9/45*  (2006.01)

(52) U.S. Cl. ............... 717/106; 717/136; 717/137

(58) Field of Classification Search ......... 717/100–109, 717/136, 137; 715/501.1, 505, 513, 854; 707/1, 3, 100
See application file for complete search history.

(56) References Cited

U.S. PATENT DOCUMENTS

| | | | | |
|---|---|---|---|---|
| 6,154,738 A * | 11/2000 | Call | ............... | 707/4 |
| 6,311,194 B1 * | 10/2001 | Sheth et al. | ............... | 715/505 |
| 6,476,833 B1 * | 11/2002 | Moshfeghi | ............... | 715/854 |
| 6,665,658 B1 * | 12/2003 | DaCosta et al. | ............... | 707/3 |
| 6,715,129 B1 * | 3/2004 | Hind et al. | ............... | 715/513 |
| 6,895,551 B1 * | 5/2005 | Huang et al. | ............... | 715/513 |
| 7,039,654 B1 * | 5/2006 | Eder | ............... | 707/104.1 |
| 7,085,736 B2 * | 8/2006 | Keezer et al. | ............... | 705/27 |
| 7,107,535 B2 * | 9/2006 | Cohen et al. | ............... | 715/736 |
| 7,137,065 B1 * | 11/2006 | Huang et al. | ............... | 715/513 |
| 7,162,691 B1 * | 1/2007 | Chatterjee et al. | ............... | 715/513 |
| 7,188,150 B2 * | 3/2007 | Grueneberg et al. | ............... | 709/217 |
| 7,231,606 B2 * | 6/2007 | Miller et al. | ............... | 715/738 |
| 7,249,345 B2 * | 7/2007 | Zorc | ............... | 717/106 |
| 2002/0112224 A1 * | 8/2002 | Cox | ............... | 717/100 |
| 2002/0161745 A1 * | 10/2002 | Call | ............... | 707/1 |
| 2003/0110253 A1 * | 6/2003 | Anuszczyk et al. | ............... | 709/224 |
| 2003/0115572 A1 * | 6/2003 | Zondervan et al. | ............... | 717/109 |
| 2003/0130994 A1 * | 7/2003 | Singh et al. | ............... | 707/3 |
| 2003/0149934 A1 * | 8/2003 | Worden | ............... | 715/513 |
| 2003/0172368 A1 * | 9/2003 | Alumbaugh et al. | ............... | 717/106 |
| 2004/0193628 A1 * | 9/2004 | Hiraiwa | ............... | 707/100 |
| 2004/0205574 A1 * | 10/2004 | Sayers et al. | ............... | 715/513 |
| 2004/0205585 A1 * | 10/2004 | McConnell | ............... | 715/513 |

(Continued)

OTHER PUBLICATIONS

Etzioni, "A Softbot-Based Interface to the Internet," ACM, 1994, pp. 72-76.*

*Primary Examiner*—Insun Kang
(74) *Attorney, Agent, or Firm*—Pierce Atwood LLP; Kevin M. Farrell; Katherine A. Wrobel (57) ABSTRACT

A system and a method for using a computer program to automate the process of searching and or retrieving data from a particular data pool for introduction to a user is provided. More specifically, a program is used that may robotically manipulate existing web sites using computer source codes that are generated all or in part by the computer program and/or software. The system may trace, monitor and analyze a browser or network application to produce transactions and manipulate the data retrieved to automatically access previously un-accessible data from a web site.

16 Claims, 3 Drawing Sheets

U.S. PATENT DOCUMENTS

| | | | |
|---|---|---|---|
| 2005/0050166 A1* | 3/2005 | Reynolds et al. | 709/218 |
| 2005/0114757 A1* | 5/2005 | Sahota et al. | 715/501.1 |
| 2005/0234860 A1* | 10/2005 | Roever et al. | 707/1 |
| 2005/0273772 A1* | 12/2005 | Matsakis et al. | 717/136 |
| 2006/0106703 A1* | 5/2006 | Del Rey et al. | 705/35 |
| 2006/0117294 A1* | 6/2006 | Vogler | 717/104 |
| 2006/0265670 A1* | 11/2006 | Cohen et al. | 715/854 |
| 2006/0294500 A1* | 12/2006 | Chiang | 717/109 |
| 2007/0038610 A1* | 2/2007 | Omoigui | 707/3 |

* cited by examiner

AUTOMATED SOFTWARE ROBOT GENERATOR

PRIORITY DOCUMENTS

This document claims priority to an earlier filed provisional patent application filed on Nov. 1, 2002, having Ser. No. 60/423,648.

FIELD OF THE INVENTION

This invention pertains to the field of computer programming. More specifically, the invention relates to a software program that can generate source code for other computer programs that can then robotically manipulate existing web sites. The software program may also trace, monitor and add support framework to an interactive internet browser. Moreover, an end user can modify the source code generated by the software to further increase the utility of the generated software source code.

BACKGROUND OF THE INVENTION

The internet, and more specifically, the World Wide Web, has hundreds of millions of pages available, waiting to present information on a variety of topics to an individual. In addition, many companies, organizations, and individuals have constructed true applications using the World Wide Web as the delivery medium. Consumers can now conduct on-line banking, shop for automobiles, participate in on-line auctions, and many other activities of a transactional nature. World Wide Web based applications such as those mentioned above all present the user with the various screens and data that make up the application through a web browser such as NETSCAPE NAVIGATOR, or MICROSOFT INTERNET EXPLORER. Software engineers term these types of World Wide Web transactional programs 'Web Applications' in contrast to software applications that run on older text based terminals, or in contrast to older client server technologies. Broadly then, World Wide Web has produced 2 classes of content. The first class of content may be read-only content, in which the user is directed to a specific web page and can then read the content of that page. The second class of content are Web applications, wherein the user actually enters data in an interactive manner to perform some tasks, like shopping for a product, performing a banking transaction, etc.

All World Wide Web applications and content present and retrieve user input using (broadly) two technologies. The first is the actual network protocol that is hidden from the user. This protocol is widely known as the Hypertext Transfer Protocol, or simply 'HTTP'. The format of the information flowing over HTTP and subsequently accepted by a web browser, or conversely a web server is Hypertext Markup Language, or simply 'HTML'.

A very important part of web technology is that it functions over a public network. Thus almost anyone can, from a home computer, view web pages that are actually published all over the world. From a business perspective, the 'publicness' of the World Wide Web has removed a big barrier for moving data between companies and companies, and between companies and individuals. Heretofore, if two companies wanted to exchange business information, they would typically construct a private network, then agree on a protocol, then implement software that supported the agreed upon protocol, then transfer the data. Usually that process took months or years of work. Today, using the World Wide Web, each company simply publishes the data to their web server, and any of its authorized partners can see the data visually using a web browser.

As the web grew in the 1990's billions of web pages were produced. In addition, thousands of web applications were produced. While on the whole this has been a positive development for technologist, it has created a unique problem as regards integration of content and data from these many web pages and applications. Web technology today focuses on human beings being able to interact with a web browser to view and modify web based information. However there is a great need for machine to machine communication over the Internet, as contrasted with human to machine which is what constitutes the bulk of all activity on the Internet today.

Machine to machine communication over the internet using HTTP and HTML is problematic. The fundamental reason for that is that HTML is more suitable as a publishing format, rather than a data exchange format. For example, it is trivial for a human to use a web browser to go, to a banking site and check his/her account balance, it is much harder to write a piece of software that will, from a computer, access a bank web site, login, and query for an account balance, returning the data, not in HTML, but in a more 'machine friendly' format like the Extensible Markup Language (XML).

Programs that access web sites, that are normally accessed by human users sitting at a computer using a web browser, are call variously 'software robots', 'robots', 'software agents', 'agents', 'programs' or other. Programs that access web sites appear from a network and data presentation format, to the web site as an end user would. The web site or web application receives and sends information exactly as it would to a real human user, but instead the information is received, processed, and responded to by a piece of software running on a computer somewhere on the Internet, rather than a live human user using a web browser. In these applications, the web site, or web application does not know it is communicating with anything other than a web browser, when in fact it is communicating with a piece of custom written software.

Today the majority if not all of these robotic applications are hand written by skilled software engineers. New web sites and applications are being created at a rate that is much more rapid than the ability of software engineers to write corresponding robotic applications. So in general web applications today immediately allow human users to perform some function, but do not support machine to machine communication.

No invention exists today that automatically generates software robots that can manipulate existing web sites and web applications. The net effect of the invention is a dramatic reduction in the amount of time necessary to implement machine to machine communications that utilize existing web sites and web applications.

Moreover, no application or program exists today that uses a system of monitoring and analyzing functions placed to a distinct web browser or other network based application to produce an extract of network transactions that can be manipulated by software to perform the desire operation automatically.

Further, no system of application exists for a program to emulate the transactions of the network based application and mimic the transactions in later access of the same network based applications or other relevant network abilities.

SUMMARY OF THE INVENTION

The present invention provides a system and a method for generating a computer program to automate the process of searching and or retrieving data from a particular data pool for introduction to a user, performing machine to machine communications, retrieving web content, or robotically driving a transaction that exists on a web application. More specifically, the present invention provides a program that robotically manipulates existing web sites using computer source codes that is generated all or in part by the computer program and/or software. The system may trace, monitor and analyze a browser or network application to produce transactions and manipulate the data retrieved to automatically access previously un-accessible data from a web site.

To this end, in an embodiment of the present invention, a system for manipulating existing websites is provided. The system has a computer software program to collect data on existing websites. The program has a tracing means for tracing an existing website when the website is being accessed by third party users. The system also has a filtering means for filtering the collected data on existing websites. Moreover, the system may generate a source code and software robot that mimic a user using a web browser on the site.

In an embodiment, the system for manipulating existing websites has a tracing means wherein the tracing means uses an application programming interface wherein said interface intercepts application programming calls and records the parameters and data passed to the call.

In an embodiment, the system for manipulating existing websites has a tracing means wherein the tracing means collects Internet protocol (IP) network event data obtainable from application programming interfaces (APIs) including WINDOWS SOCKET (WINSOCK) API, MICROSOFT WinInet API, MICROSOFT shell API, MICROSOFT security API, MICROSOFT User API, MICROSOFT Active Directory API, MICROSOFT HTML API and MICROSOFT DOM application programming interfaces.

In an embodiment, the system for manipulating existing websites has a computer program wherein the computer program monitors data and events running on MICROSOFT WINDOWS operating systems.

In an embodiment, the system for manipulating existing websites has a computer program wherein the computer program monitors data and events running on a third party operating system.

In an embodiment, the system for manipulating existing websites has a filtering means wherein the filtering means allows for removal of redundant and useless information collected during the tracing. They system may facilitate removal of network management packets that are acknowledgements and retries. The system may facilitate collation of IP packets into single HTTP based messages and collation of HTTP messages into single records of content objects, including HTML, images, audio, and other HTTP content.

In an embodiment, the system for manipulating existing websites has a filtering means wherein the filtering means analysis the trace performed. The analysis may show an XML record for each content object in the order the content was received. Moreover, the analysis may show an XML record redirect records and added redirect information, XML record for cookie reads, XML record for cookie writes and XML record for user navigation events. Still further the analysis may show HTTP header information such as XML and various other management information relating to the network and user event traces.

In an embodiment, the system for manipulating existing websites has the source code wherein the source code is generated by the computer program and further wherein said source code mimics what a user is doing during tracing and is generated by transforming XML to XSL.

In an embodiment, the system for manipulating existing websites has the source code wherein the source code is generated by the computer program and further wherein said source code is generated by hard coding and further wherein said source code is generated by using a computer language to parse filtering means and generate some other useful product from the filtering means.

In an embodiment, the system for manipulating existing websites has the source code wherein the source code is transformed to XSL wherein a XSL code exists for popular languages including JAVA, JAVASCRIPT, VISUAL BASIC, COLD FUSION, C/C++, PASCAL and a plurality of other computer languages.

In an embodiment, the system for manipulating existing websites has a software robot wherein said software robot can interface with a website and manipulate the website during use.

In an embodiment of the present invention, a method for manipulating an existing website is provided. The method has the steps of: providing a computer software program to collect data on existing websites; tracing an existing website when the website is being accessed by third party users; filtering the collected data on existing websites; analyzing the data collected from traced and filtered websites; and generating a source code.

In an embodiment, the method further comprises the step of providing an application programming interface to record data from existing websites.

In an embodiment, the method further comprises the step of tracing an existing website to collect data from Internet protocol (IP) events and a plurality of application programming interfaces.

In an embodiment, the method further comprises the step of allowing an end user to hard code the generated source code.

In an embodiment, the method further comprises the step of automating the generation of source code to an end user.

In an embodiment, the method further comprises the step of allowing the computer program to interface with an existing website to automatically produce a desired outcome including: automatic form fill-in on a web page; interfacing with a website to obtain information previously unattainable; performing system testing of a website; and performing software change controls to monitor existing websites for change to the underlying site.

In an embodiment, the method further comprises the step of integrating the software into a web browser as a browser plug-in.

In an embodiment, the method further comprises the step of integrating the software into a web browser as an extension wherein the integrated software may display debug messages, HTTP header parameters, and other data.

In an embodiment, the method further comprises the step of allowing an end user to click on a button in a web browser plug-in that completes multiple forms without further user intervention.

It is, therefore, an advantage of the present invention to provide an automated software robot generator and a method for using the same.

Another advantage of the present invention is to provide an automated software robot generator and a method for, using the same wherein the software can trace a browser and/or other network based application.

Still another advantage of the present invention is to provide an automated software robot generator and a method for using the same wherein the software may monitor a browser and/or other network based application.

Yet another advantage of the present invention is to provide an automated software robot generator and a method for using the same wherein the software may filter a browser and/or other network based application.

Still another advantage of the present invention is to provide an automated software robot generator and a method for using the same wherein the software may analyze a browser and/or network based application.

Another advantage of the present invention is to provide an automated software robot generator and a method for using the same wherein the software may trace, monitor, filter and/or analyze a browser and/or network based application to produce an XML representation of network transactions.

Yet another advantage of the present invention is to provide an automated software robot generator and a method for using the same wherein the software may trace, monitor, filter and/or analyze a browser and/or network based application to produce screen data manipulation techniques.

Another advantage of the present invention is to provide an automated software robot generator and a method for using the same wherein the software may trace, monitor, filter and/or analyze a browser and/or network based application to retrieve cookie activities.

Still another advantage of the present invention is to provide an automated software robot generator and a method for using the same wherein the software may trace, monitor, filter and/or analyze a browser and/or network based application to retrieve HTTP headers.

Yet another advantage of the present invention is to provide an automated software robot generator and a method for using the same wherein the software may trace, monitor, filter and/or analyze a browser and/or network based application to retrieve relevant network, user and/or other events.

Another advantage of the present invention is to provide an automated software robot generator and a method for using the same wherein the software may trace, monitor, filter and/or analyze MICROSOFT WINDOWS based applications and being capable of attaching into the network event layer of the application and tracing it.

Yet another advantage of the present invention is to provide an automated software robot generator and a method for using the same wherein the software may trace, monitor, filter and/or analyze a UNIX or UNIX variant shared library and be capable of attaching into the network event layer of the UNIX application and tracing it.

Still another advantage of the present invention is to provide an automated software robot generator and a method for using the same wherein the software may trace, monitor, filter and/or analyze a plurality of network applications and be capable of attaching into the plurality of network applications and tracing them.

Another advantage of the present invention is to provide an automated software robot generator and a method for using the same wherein the software may generate computer source code capable of emulating the transactions obtained from monitoring and filtering of network applications.

Still another advantage of the present invention is to provide an automated software robot generator and a method for using the same wherein the software may generate computer source code capable of emulating the data, and other events obtained from monitoring and filtering of network applications.

An advantage of the present invention is to provide an automated software robot generator and a method for using the same wherein the source codes generated by the software may be modified by an end user.

Yet another advantage of the present invention is to provide an automated software robot generator and a method for using the same wherein the source codes generated by the software may be modified by an end user to produce a large number of variations of output source codes.

Still another advantage of the present invention is to provide an automated software robot generator and a method for using the same wherein the software may transform XML code into another source code language.

Another advantage of the present invention is to provide an automated software robot generator and a method for using the same wherein the software may use XSL to transform XML code into another source code language.

Yet another advantage of the present invention is to provide an automated software robot generator and a method for using the same wherein the software may use XSL to transform codes derived from the filtering and analyzed network trace into a source code language.

Still another advantage of the present invention is to provide an automated software robot generator and a method for using the same wherein the software may modify a source code language to include support for an interactive browser.

An advantage of the present invention is to provide an automated software robot generator and a method for using the same wherein the software may modify a source code to include a playback function.

Yet another advantage of the present invention is to provide an automated software robot generator and a method for using the same wherein the software may modify a source code to include a debug function.

Still another advantage of the present invention is to provide an automated software robot generator and a method for using the same wherein the software may employ a plug-in that may be inserted into browser application that may robotically drive the website.

Another advantage of the present invention is to provide an automated software robot generator and a method for using the same wherein the software may employ a plug-in that may be inserted into the browser application and that may drive the website while displaying in the web browser the web pages that are being driven.

Yet another advantage of the present invention is to provide an automated software robot generator and a method for using the same wherein the software may employ a plug-in that may be inserted into a browser application and that may drive the website without showing the end user the web pages that are being driven.

Still another advantage of the present invention is to provide an automated software robot generator and a method for using the same wherein the software may capture protocol and application data flowing over a network application.

Another advantage of the present invention is to provide an automated software robot generator and a method for using the same wherein the software may analyze a network trace and process that trace into an XML based code format.

Yet another advantage of the present invention is to provide an automated software robot generator and a method for using the same wherein the software may analyze the data wherein packets of data that may have been in temporal order may be grouped into integrated blocks of data.

An advantage of the present invention is to provide an automated software robot generator and a method for using the same wherein the software may allow drag and drop or other manipulation of the XML extract in preparation for code generation.

Still another advantage of the present invention is to provide an automated software robot generator and a method for using the same wherein the software may convert and/or modify XML code using XSL.

Yet another advantage of the present invention is to provide an automated software robot generator and a method for using the same wherein the software may convert and/or modify the XML code into XML.

Another advantage of the present invention is to provide an automated software robot generator and a method for using the same wherein the software may convert and/or modify the XML code into computer source code.

Still another advantage of the present invention is to provide an automated software robot generator and a method for using the same wherein the software may convert and/or modify the XML code into database records.

Yet another advantage of the present invention is to provide an automated software robot generator and a method for using the same wherein the software may convert and/or modify the XML code into MICROSOFT OFFICE documents.

An advantage of the present invention is to provide an automated software robot generator and a method for using the same wherein the software may convert and/or modify the XML code into HTML or other Internet formats.

Yet another advantage of the present invention is to provide an automated software robot generator and a method for using the same wherein the software may convert and/or modify the XML code into JAVA and/or JAVASCRIPT.

Still another advantage of the present invention is to provide an automated software robot generator and a method for using the same wherein the software may convert and/or modify the XML code into COLD FUSION.

Another advantage of the present invention is to provide an automated software robot generator and a method for using the same wherein the software may convert and/or modify the XML code into C++.

An advantage of the present invention is to provide an automated software robot generator and a method for using the same wherein the software may convert and/or modify the XML code into other source codes.

Still another advantage of the present invention is to provide an automated software robot generator and a method for using the same wherein the software may be integrated into a browser as a browser plug-in or extension.

Yet another advantage of the present invention is to provide an automated software robot generator and a method for using the same wherein the software may be integrated into a browser and allow for stepping through the source code generated on a page by page or event by event basis.

Still another advantage of the present invention is to provide an automated software robot generator and a method for using the same wherein a web browser plugin is used to provide full interactive debugging capability to the software code that is generated during the tracing and code generation phases.

Yet another advantage of the present invention is to provide an automated software robot generator and a method for using the same wherein a web browser plug provides the ability to do most common debugging functions on the generated source code, while viewing the affect of the source code statements in the web browser itself.

Another advantage of the present invention is to provide an automated software robot generator and a method for using the same wherein debugging functions include single stepping the source code, inspecting variables, and setting debugging breakpoints.

Another advantage of the present invention is to provide an automated software robot generator and a method for using the same wherein the software may allow for display of debug messages.

Yet another advantage of the present invention is to provide an automated software robot generator and a method for using the same wherein the software may allow for display of HTTP header parameters and/or other data in the plug-in.

DESCRIPTION OF THE PREFERRED EMBODIMENT

Turning now to the drawings wherein elements are identified with numbers and like elements are identified with like numbers throughout the schematics, in an embodiment of the present invention, a computer software program 1 (also referred to interchangeably as "the program" and "the software") may perform a plurality of functions with respect to tracing and monitoring, filtering and analyzing network data. For example, the computer software program 1 may intercept network calls from a MICROSOFT WINDOWS application. The computer software program 1 may trace the network activity for the application as it observes the application in process. Typically, the network activity involves the HTTP protocol, but in other embodiments may involve other Internet protocol (IP) and non-IP based protocols.

Figure 1:
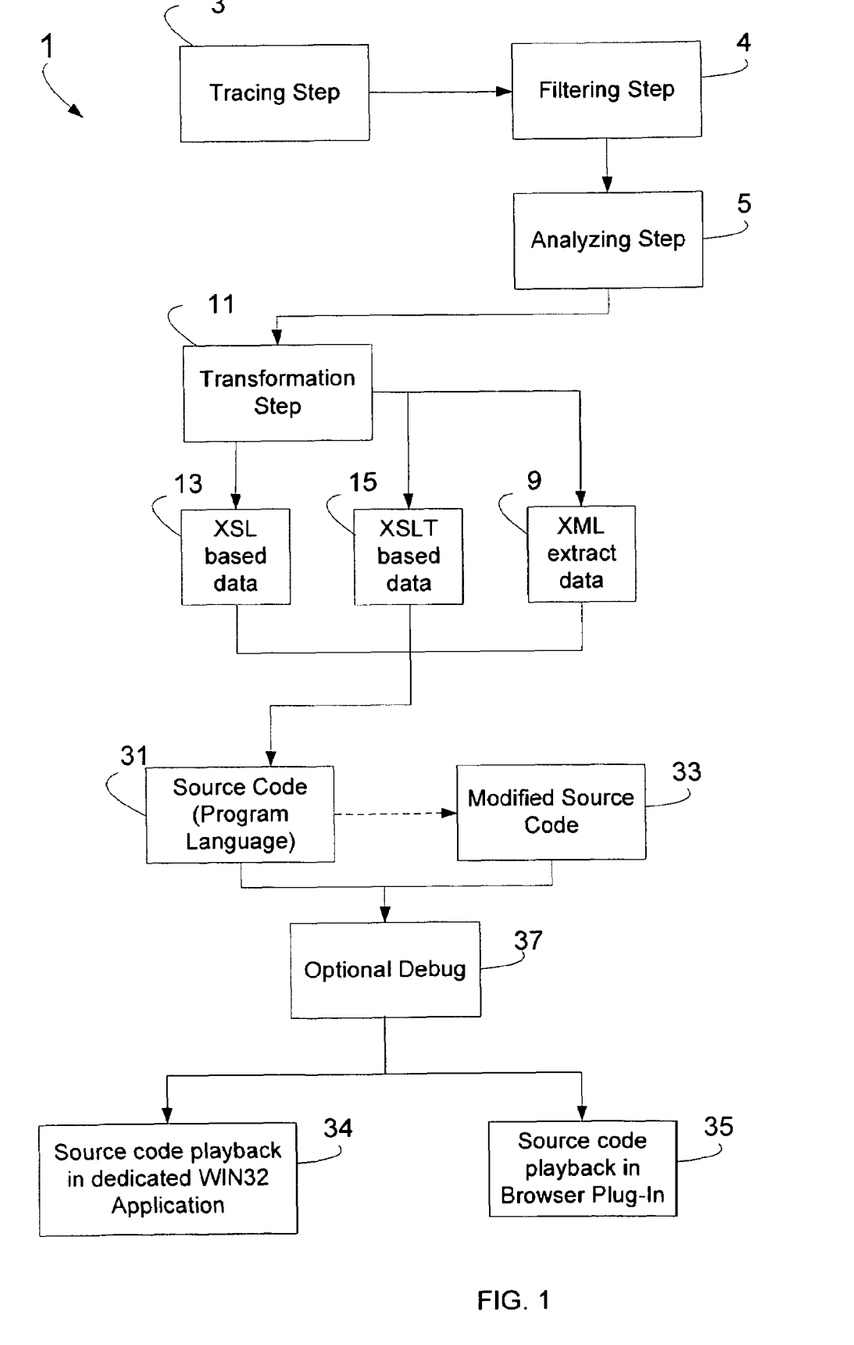
FIG. 1 is a schematic of the automated software robot generator system in an embodiment of the present invention.

FIG. 1 illustrates one embodiment of the computer software program 1 of the present invention. The computer software program 1 may capture Internet protocol (IP) and application data flowing over the network between the application being traced and one or more computers on a network attached directly or indirectly to the computer running the computer software program 1. The executable steps of the computer software program 1 comprise at least a tracing step 3, a filtering step 4 and an analyzing step 5. The tracing step 3 monitors the flow of web traffic on the Internet (not shown). The data from the network tracing step 3 may be visible to the operator, however, the traced data may also be completely hidden from view of the end user (not shown). The tracing step 3 may produce data that may be analyzed by the analyzing step 5 and processed into XML extract data 9. The XML extract data 9 obtained after processing by the analyzing step 5 may be converted, or transformed, at a transformation step 11 into XSL based data 13. Alternatively, the XML extract data 9 may be transformed into XSLT based data 15. In an embodiment of the present invention, the analyzing step 5 groups data packets that were in temporal order into integrated blocks of data for send/receive transactions.

In another embodiment of the present invention, the program may allow for drag and drop or other manipulation of the XML extract data 9 in preparation for code generation. Operations on the XML extract data 9 include, but are not limited to: adding XML nodes (not shown), deleting XML nodes (not shown), search and replace operations on nodes and data in the XML nodes (not shown).

The core data from which an embodiment of the present invention functions may include data and events obtainable on a computer running the MICROSOFT WINDOWS operating system in any of its incarnations including but not limited to WINDOWS, WINDOWS 95, WINDOWS NT, WINDOWS XP, hereinafter referred to as WINDOWS.

Figure 2:
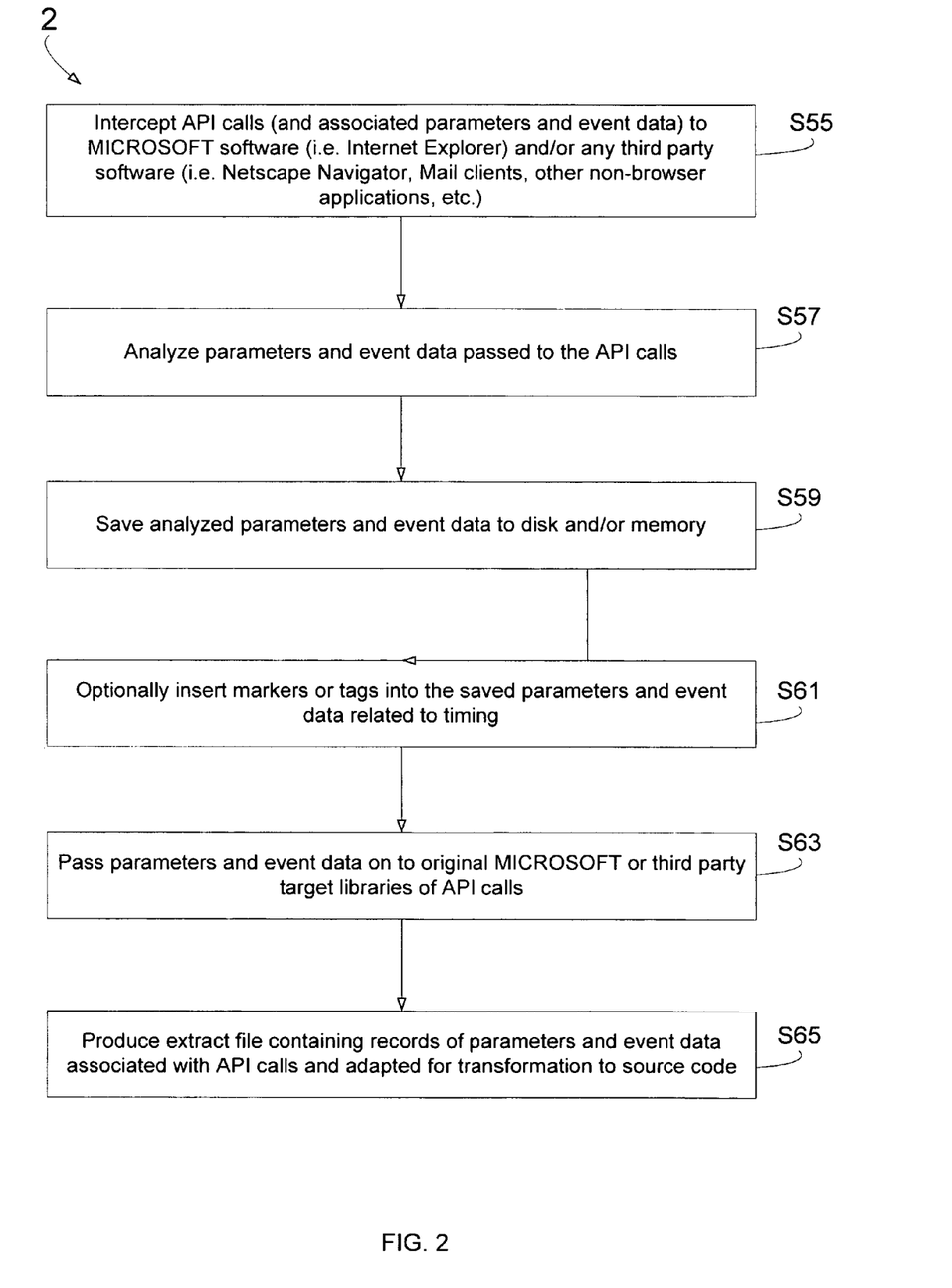
FIG. 2 is another schematic of the automated software robot system in an embodiment of the present invention.

Turning now to FIG. 2, the present invention also includes a method 2 of using the computer software program 1. The computer software program 1 may obtain data from a MICROSOFT or any third party supplied software by using an Application Programming interface (API) or software 'hook'. A software hook may work by intercepting Application Programming interface calls at a first step S55. A second step S57 comprises analyzing the parameters and data passed to the API call. In an embodiment of the present invention, the computer software program 1 obtains a detailed trace of various API calls and the parameters and data sent to and from those API's. At a third step S59, the method 2 comprises recording, or saving, the traced data (the parameters and data passed to and from the API call) in memory (RAM) or on a disk. At a fifth step S63, the computer software program 1 may then pass the parameters and data onto the original target of the API call, namely the MICROSOFT or third party library. At a final step S65, the computer software program 1 produces an extract file containing records of parameters and Internet Protocol (IP) network event data associated with API calls and adapted for transformation to source code.

In addition to tracing the original raw trace data, an embodiment of the present invention may include an optional fourth step S61 between the third step S59 and the fifth step S63. The optional fourth step 61 comprises inserting markers or tags in the saved trace data that provide added information about IP network events and data. The markers or tags may include timing, and other information used by an embodiment in the analysis and other phases.

As further illustrated in FIG. 1, the computer software program 1 comprises a hardware or software based network analyzer and/or analyzing step 5 that facilitates and aids the tracing step 3 in tracing the network at first step 55 thereby providing a suitable network trace.

In an embodiment of the present invention, the software hook of the computer software program 1 hooks into API calls and traces Internet Protocol network data and parameters passed to and from a website ("web") browser such as INTERNET EXPLORER, or NETSCAPE NAVIGATOR. However, the computer software program 1 also may trace non-browser applications such as e-mail clients, IP based file servers and many other types of non-browser applications. The types of data obtained from a browser and third party supplied products may include, but are not limited to: Internet Protocol network event data including data obtainable from the WINDOWS socket or Winsock API; Data and events obtainable from the MICROSOFT WinInet API; data and events obtainable from the MICROSOFT shell API; data and events obtainable from the MICROSOFT security API; data and events obtainable from the MICROSOFT User API; data and events obtainable from the MICROSOFT Active Directory API; data and events obtainable from MICROSOFT HTML API; and data and events obtainable from MICROSOFT DOM API.

FIG. 1 illustrates the tracing portion of the design of the computer software program 1 in an embodiment of the present invention. The tracing step 5 may result in the acquisition of a large amount of data during execution of the computer software program 1. A lot of the data obtained may be redundant in nature and not particularly useful in further processing, and further may be of little interest to the end user. The filtering step 4 removes the useless data. To eliminate the redundancy of the filtered data, the computer software program 1 removes network management packets that are acknowledgements, retries, etc. Moreover, the analyzing step 5 of the computer software program 1 may collate the IP data packets into a single HTTP based message and/or the computer software program 1 may further collate the HTTP messages into single records of content objects (not shown). The objects may be HTML, images, audio, or other HTTP content. The HTTP may also include web pages, audio, video and/or multiple other records. Additionally, HTTP interleaves content from multiple requests. In an embodiment, the filtering step 4 re-collates the individual sent/received packets of a content object into a single content record.

Again referring to FIG. 1, once the tracing step 3 and filtering step 4 process the data, the analyzing step 5 further processes the filtered trace data. The output of the analyzing step 5 is the XML extract data 9. The XML extract data 9 is referred to as the "Extract", since it may contain a condensed version of the relevant traced IP network events and associated parameters and event data. In an embodiment of the present invention, the analysis step 5 may emit an XML record for each content object in the order that it was received. Moreover, the analysis phase may emit an XML record redirect and added redirect information; emit an XML record for cookie reads/writes; emit an XML record for user navigate events which may allow a user to click on a link on a browser; emit HTTP header information as XML; and may emit various other management information relating to the network and user event trace as needed.

As shown in FIG. 1, the computer software program 1 of the present invention produces source code 31 that may mimic what the user did during the tracing step 3. The source code 31 may be used on a client machine or on a server machine. Generations of source code 31 may be via an XSL transform of the XML extract data 9. Another embodiment for generating source code 31 or other useful expressions of the XML extract data 9 may be by modification of the source code 31 to produce modified source code 33. Modification may be performed in other ways including hard coding or using a computer language to parse the extract and generate some other useful product from the XML extract data 9. This optional embodiment is shown by way of a broken line in FIG. 1 between the source code 31 and the modified source code 33.

In an embodiment of the present invention, XSL exists for transforming the XML extract data 9 into various popular languages including JAVA, JAVASCRIPT, VISUAL BASIC, COLD FUSION, C/C++, PASCAL and many others.

In an embodiment, parts of the automatically generated source code 31 embodying a software robot (hereafter referred to interchangeably as "source code" and "generated source code") may be integrated into a web browser as a browser plug-in 35 or extension. In an embodiment, this web-browser mode may allow interactive stepping through the generated source code 31 on a page by page basis. In the alternative, the browser mode may allow interactive stepping through the generated source code 31 on a event by event basis. In Browser mode, embodiments may allow the computer software program 1 to debug 37 the automatically generated source code 31 by displaying debug messages, HTTP header parameters, or other data in the browser plug-in 35.

Additionally, the software robot comprising the automatically generated source code 31 may be used to perform automated page completion. In the preferred embodiment of the present invention, end-users tend to be concerned with filling in form information on multiple pages on a web site. An embodiment of the invention allows the end user to simply click on the next or similar button in the browser plug in 35 or on the actual web page, and the source code 31 sends the appropriate data over the network as if the user had actually typed in the values on the form.

In another embodiment of the present invention, a user may click on a "run" button in the browser plug-in 35 that completes multiple forms without further user intervention.

Figure 3:
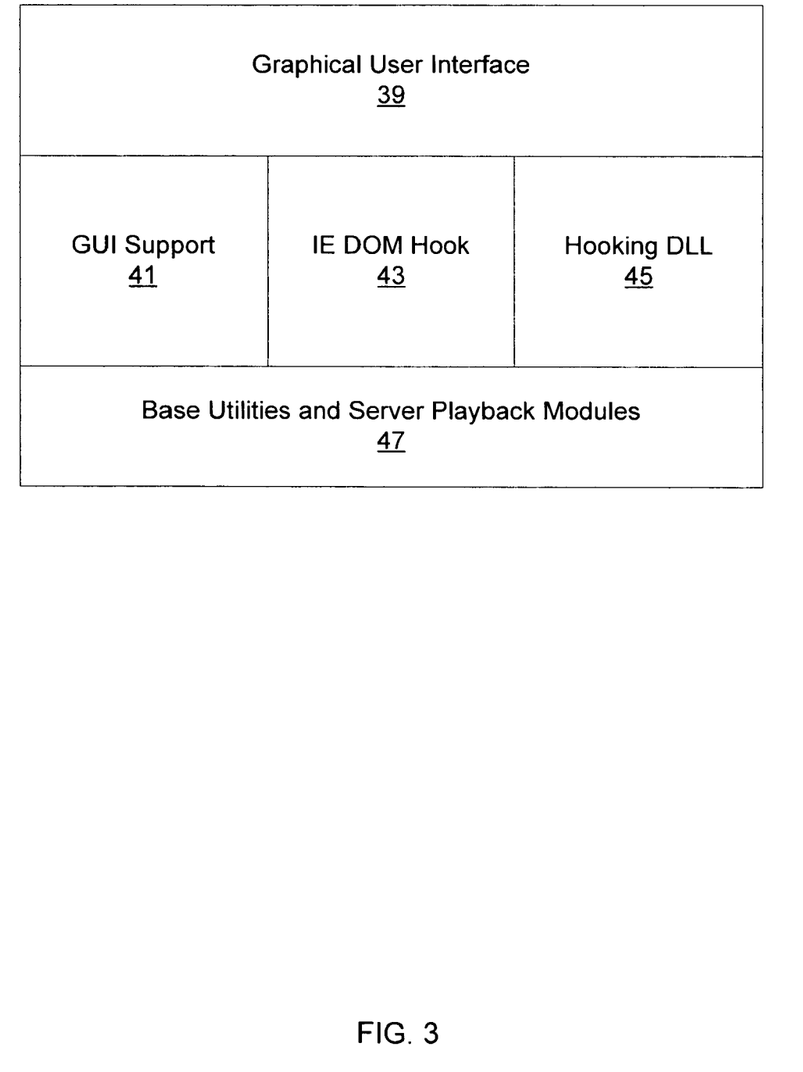
FIG. 3 is another schematic of the automated software robot system in an embodiment of the present invention.

FIG. 3 illustrates the relationship of various software modules of the computer software program 1 in an embodiment. The software modules may be divided into those that run during the analysis data capture phase, and software that may run either on a client and/or on a server machine during playback of generated source code 31. Client playback may be either via a dedicated win32 application 34 or a web browser plug-in 35 and/or browser helper object. As FIG. 3 illustrates, the Graphic user interface (GUI) 39 manages the main application, windows, and controls necessary to trace, analyze, generate source code 31 and test. The GUI support 41 provides high level support routines for manipulating the extract, trace and other high level objects. The INTERNET EXPLORER (or any other browser application) DOM Hook 43, hooks the document model, manipulates and controls the record/playback, browser windows, winsock.dll, wininet.dll, user32.dll and others. The Hooking DLL 45 hooks winsock.dll, wininet.dll, user32.dll and others.

The computer software program 1 also includes base utilities 47 and server playback modules that may have code for thread, lock, process, and other core operating system and software functions. The computer software program 1 may also have a single, fully threaded version of the server software.

I claim:

1. A system in communication with a computer network for manipulating at least one existing website displayable over the computer network, the system comprising:
   a) a processor portion and a memory portion having a computer software program stored thereon that comprises steps executable by the processor portion, wherein the executable steps comprise:
      i) accessing the at least one existing website as directed by a user of the system;
      ii) tracing API calls by intercepting associated parameters and Internet Protocol network event data obtained from one or more application programming interfaces while accessing the at least one existing website;
      iii) filtering the Internet Protocol network event data passed to and from the API calls by removing network management packets that are acknowledgements and retries, collating IP packets into single HTTP based messages; and collating HTTP based messages into single records of content objects, wherein the content objects comprise HTML, images, audio, and other HTTP content;
      iv) analyzing the API calls and associated parameters and Internet Protocol network event data passed to and from the API calls;
      v) producing an XML extract file comprising an XML record for each content object in temporal order of receipt, an XML redirect record and added redirect information, an XML record for cookie read, an XML record for cookie writes, an XML record for user navigation events, an XML record for HTTP header information; and one or more management information records relating to the API calls and associated parameters and Internet Protocol network event data passed to and from the API calls; and
      vi) automatically generating a source code from the traced and filtered Internet Protocol network event data that is executable by the processor portion, and thereby automatically generating an executable software robot that mimics the user using a web browser to access the at least one existing website; and
   b) the automatically generated executable software robot stored in the memory portion for execution by the processor portion when an end user requests playback.

2. The system of claim 1 wherein the Internet Protocol network event data is obtainable from a group of APIs consisting of Winsock API, MICROSOFT WinInet API, MICROSOFT shell API, MICROSOFT security API, MICROSOFT User API, MICROSOFT Active Directory API, MICROSOFT HTML API, MICROSOFT DOM API and/or any combination thereof.

3. The system of claim 1 wherein the computer software program traces Internet Protocol network event data obtainable on a computer running a MICROSOFT WINDOWS operating system.

4. The system of claim 1 wherein the Internet Protocol network event data comprises data passed to and from a website browser application and/or a non-website browser application.

5. The system of claim 1 wherein the executable step of generating source code further comprises transforming the XML extract file into executable source code via XSL.

6. The system of claim 1 wherein the executable step of generating source code further comprises using a computer language to parse the XML extract file.

7. The system of claim 5 wherein XSL transforms the XML extract file into source code written in a programming language selected from a group consisting of JAVA, JAVASCRIPT, VISUAL BASIC, COLD FUSION, C/C++, PASCAL and a plurality of other computer languages.

8. The system of claim 1 wherein the software robot is adapted to interface with the at least one existing website and automatically manipulate the at least one existing website during use.

9. A method for manipulating an existing website in communication with a computer network, the method comprising the steps of:
   a) providing a system, also in communication with the computer network, comprising a processor portion and a memory portion having executable steps stored thereon for execution by the processor portion, wherein said executable steps comprise:
      i) tracing API calls in temporal order between the system and the existing website and associated parameters and data associated with Internet Protocol (IP) network events passed to and from the API calls when a system user accesses the existing website;
      ii) filtering the data passed to and from the API calls by removing network management packets that are acknowledgements and retries, collating IP packets into single HTTP based messages; and collating HTTP based messages into single records of content objects, wherein the content objects comprise HTML, images, audio, and other HTTP content;
      iii) analyzing the data to produce an extract file comprising an XML record for each content object in temporal order of receipt, an XML redirect record and added redirect information, an XML record for cookie read, an XML record for cookie writes, an XML record for user navigation events, an XML record for HTTP header information, and one or more management information records relating to the API calls and associated parameters and Internet Protocol network event data passed to and from the API calls and iv) automatically generating a software robot that comprises executable source code derived from the extract file, wherein executing the source code parsed from the extract file automatically instructs the system to mimic interactions between the system user and the existing website; and b) executing steps i) through iv), thereby automatically generating a software robot that manipulates the existing website by automatically instructing the system to mimic interactions between the system user and the existing website and that is adapted for playback on the IP network level at the request of an end user.

10. The method of claim 9 further comprising a step following the filtering step of recording to the memory portion the API calls and associated parameters and data passed to and from the API calls.

11. The method of claim 9 wherein the generating step comprises prompting an end user to hard code the source code from the XML extract file.

12. The method of claim 9 wherein the generating step comprises automating the derivation of source code from the XML extract file.

13. The method of claim 9 wherein the software robot is adapted for interfacing with the existing website to automatically fill-in one or more forms on a web page; obtain information previously unattainable; to perform system testing of the website; and/or to monitor the existing website for change.

14. The method of claim 9 further comprising the step of integrating the executable steps into a website browser as a plug-in.

15. The method of claim 14 wherein the source code is adapted for interactive stepping through on a page-by-page or event-by-event basis so that debug messages adapted for providing full interactive debugging capability to the source code, HTTP header parameters, and other data are displayed in the plug-in.

16. The method of claim 9 further comprising a final step of displaying a selectable button in a web browser plug-in that automates completion of multiple forms without further user intervention.

\* \* \* \* \*